US012634825B2

(12) United States Patent
Koskela et al.

(10) Patent No.: US 12,634,825 B2
(45) Date of Patent: May 19, 2026

(54) ADAPTING AT LEAST ONE OPERATION PARAMETER

(71) Applicant: NOKIA TECHNOLOGIES OY, Espoo (FI)

(72) Inventors: Timo Koskela, Oulu (FI); Jussi-Pekka Koskinen, Oulu (FI); Jorma Johannes Kaikkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 819 days.

(21) Appl. No.: 17/754,015

(22) PCT Filed: Oct. 1, 2019

(86) PCT No.: PCT/EP2019/076610
§ 371 (c)(1),
(2) Date: Mar. 21, 2022

(87) PCT Pub. No.: WO2021/063490
PCT Pub. Date: Apr. 8, 2021

(65) Prior Publication Data
US 2022/0330154 A1 Oct. 13, 2022

(51) Int. Cl.
*H04W 52/02* (2009.01)
*H04W 24/10* (2009.01)
*H04W 76/30* (2018.01)

(52) U.S. Cl.
CPC ....... *H04W 52/0235* (2013.01); *H04W 24/10* (2013.01); *H04W 52/0216* (2013.01); *H04W 76/30* (2018.02)

(58) Field of Classification Search
CPC . H04W 24/10; H04W 76/00–40; Y02D 30/70
See application file for complete search history.

(56) References Cited

U.S. PATENT DOCUMENTS

2012/0213137 A1* 8/2012 Jeong ................ H04W 52/0235
                                                    370/311
2013/0229931 A1   9/2013 Kim
2013/0231120 A1*  9/2013 Koc ..................... H04W 76/34
                                                    455/450
(Continued)

FOREIGN PATENT DOCUMENTS

CN       101529831 A     9/2009
CN       104012152 A     8/2014
(Continued)

OTHER PUBLICATIONS

Office Action and Search Report for Chinese Patent Application No. 201980101055.2, mailed on Jan. 25, 2024, 13 pages.
(Continued)

*Primary Examiner* — San Htun
(74) *Attorney, Agent, or Firm* — Brake Hughes Bellermann LLP

(57) ABSTRACT
An apparatus, method and computer program product for: receiving a control message comprising power saving information, determining, based on the power saving information, adaptation of at least one operation parameter relating to radio resource management in the low-power mode and causing adapting the at least one operation parameter relating to radio resource management according to the determined adaptation.

15 Claims, 2 Drawing Sheets

(56) References Cited

U.S. PATENT DOCUMENTS

| | | | |
|---|---|---|---|
| 2013/0267213 A1* | 10/2013 | Hsu | H04W 52/0232 |
| | | | 455/418 |
| 2013/0301499 A1 | 11/2013 | Jain et al. | |
| 2014/0044030 A1* | 2/2014 | Ramachandran | |
| | | | H04W 52/0261 |
| | | | 370/311 |
| 2014/0094127 A1 | 4/2014 | Dimou et al. | |
| 2015/0085677 A1* | 3/2015 | Pourahmadi | H04W 52/244 |
| | | | 370/252 |
| 2015/0215830 A1* | 7/2015 | Dalsgaard | H04W 36/0088 |
| | | | 455/444 |
| 2015/0223166 A1 | 8/2015 | Keskitalo et al. | |
| 2016/0073341 A1 | 3/2016 | Chao et al. | |
| 2017/0245213 A1* | 8/2017 | Martinez Tarradell | |
| | | | H04L 5/0048 |
| 2019/0150114 A1 | 5/2019 | Liu et al. | |
| 2019/0253966 A1 | 8/2019 | Park et al. | |
| 2019/0254110 A1 | 8/2019 | He et al. | |
| 2019/0335397 A1* | 10/2019 | Ganesan | H04W 52/0235 |

FOREIGN PATENT DOCUMENTS

| | | |
|---|---|---|
| CN | 104105175 A | 10/2014 |
| CN | 104396313 A | 3/2015 |
| CN | 105611553 A | 5/2016 |
| CN | 106105330 A | 11/2016 |
| CN | 108882266 A | 11/2018 |
| WO | 2014085981 A1 | 6/2014 |
| WO | 2014086168 A1 | 6/2014 |

OTHER PUBLICATIONS

International Search Report and Written Opinion for International Application No. PCT/EP2019/076610, mailed on Jun. 22, 2020, 12 pages.

International Preliminary Report on Patentability for International Application No. PCT/EP2019/076610; mailed on Oct. 15, 2021; 17 pages.

Office Action and Search Report for Chinese Patent Application No. 201980101055.2, mailed on Aug. 12, 2024, 21 pages.

Examination Report for India Application No. 202247024678, mailed on Aug. 24, 2022, 7 pages.

Office Action for Chinese Patent Application No. 201980101055.2, mailed on Nov. 20, 2024, 19 pages.

Communication pursuant to Article 94(3) EPC for European Patent Application No. 19782990.6, mailed on Apr. 15, 2025, 8 pages.

Office Action for European Application No. 19782990.6, mailed on Jun. 25, 2024, 8 pages.

* cited by examiner

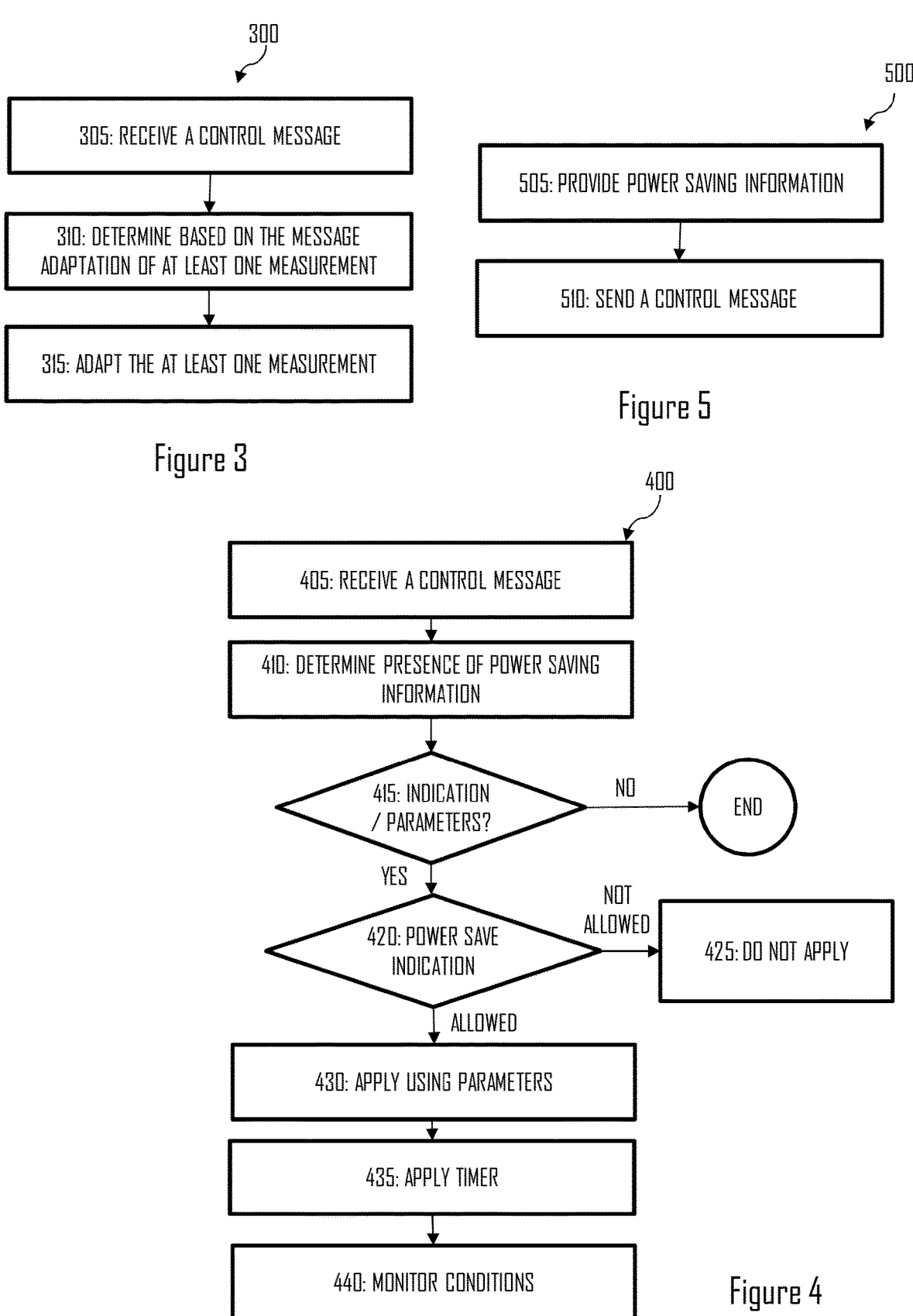

300

305: RECEIVE A CONTROL MESSAGE

310: DETERMINE BASED ON THE MESSAGE ADAPTATION OF AT LEAST ONE MEASUREMENT

315: ADAPT THE AT LEAST ONE MEASUREMENT

505: PROVIDE POWER SAVING INFORMATION

510: SEND A CONTROL MESSAGE

405: RECEIVE A CONTROL MESSAGE

410: DETERMINE PRESENCE OF POWER SAVING INFORMATION

415: INDICATION / PARAMETERS?

NO → END

YES

420: POWER SAVE INDICATION

NOT ALLOWED → 425: DO NOT APPLY

ALLOWED

430: APPLY USING PARAMETERS

435: APPLY TIMER

440: MONITOR CONDITIONS

Figure 4

ADAPTING AT LEAST ONE OPERATION PARAMETER

CROSS-REFERENCE TO RELATED APPLICATIONS

This application is a national stage entry of International Application No. PCT/EP2019/076610, filed Oct. 1, 2019, entitled "ADAPTING AT LEAST ONE OPERATION PARAMETER" which is hereby incorporated by reference in its entirety.

TECHNICAL FIELD

The present application relates generally to adapting at least one operation parameter. More specifically, the present application relates to adapting at least one operation parameter in a low-power mode.

BACKGROUND

Electronic devices may have different operating states in order optimize operation and/or power consumption of a device in different situations.

SUMMARY

Various aspects of examples of the invention are set out in the claims. The scope of protection sought for various embodiments of the invention is set out by the independent claims. The examples and features, if any, described in this specification that do not fall under the scope of the independent claims are to be interpreted as examples useful for understanding various embodiments of the invention.

According to a first aspect of the invention, there is provided an apparatus comprising means for performing: receiving a control message comprising power saving information, determining, based on the power saving information, adaptation of at least one operation parameter relating to radio resource management in the low-power mode and causing adapting the at least one measurement relating to radio resource management according to the determined adaptation.

According to a second aspect of the invention, there is provided a method comprising: receiving a control message comprising power saving information, determining, based on the power saving information, adaptation of at least one operation parameter relating to radio resource management in the low-power mode and causing adapting the at least one measurement relating to radio resource management according to the determined adaptation.

According to a third aspect of the invention, there is provided a computer program comprising instructions for causing an apparatus to perform at least the following: receiving a control message comprising power saving information, determining, based on the power saving information, adaptation of at least one operation parameter relating to radio resource management in the low-power mode and causing adapting the at least one measurement relating to radio resource management according to the determined adaptation.

According to a fourth aspect of the invention, there is provided an apparatus comprising at least one processor and at least one memory including computer program code, the at least one memory and the computer program code configured to with the at least one processor, cause the apparatus at least to: receive a control message comprising power saving information, determine, based on the power saving information, adaptation of at least one operation parameter relating to radio resource management in the low-power mode and cause adapting the at least one operation parameter relating to radio resource management according to the determined adaptation.

According to a fifth aspect of the invention, there is provided a non-transitory computer readable medium comprising program instructions for causing an apparatus to perform at least the following: receiving a control message comprising power saving information, determining, based on the power saving information, adaptation of at least one operation parameter relating to radio resource management in the low-power mode and causing adapting the at least one measurement relating to radio resource management according to the determined adaptation.

According to a sixth aspect of the invention, there is provided a computer readable medium comprising program instructions for causing an apparatus to perform at least the following: receiving a control message comprising power saving information, determining, based on the power saving information, adaptation of at least one operation parameter relating to radio resource management in the low-power mode and causing adapting the at least one measurement relating to radio resource management according to the determined adaptation.

According to a seventh aspect of the invention, there is provided an apparatus comprising means for performing: providing power saving information for adapting at least one operation parameter relating to radio resource management in a low-power mode of a terminal device and sending a control message comprising the power saving information to the terminal device.

According to an eight aspect of the invention, there is provided a method comprising: providing power saving information for adapting at least one operation parameter relating to radio resource management in a low-power mode of a terminal device and sending a control message comprising the power saving information to the terminal device.

According to a ninth aspect of the invention, there is provided a computer program comprising instructions for causing an apparatus to perform at least the following: providing power saving information for adapting at least one operation parameter relating to radio resource management in a low-power mode of a terminal device and sending a control message comprising the power saving information to the terminal device.

According to a tenth aspect of the invention, there is provided an apparatus comprising at least one processor and at least one memory including computer program code, the at least one memory and the computer program code configured to with the at least one processor, cause the apparatus at least to: provide power saving information for adapting at least one operation parameter relating to radio resource management in a low-power mode of a terminal device and send a control message comprising the power saving information to the terminal device.

According to an eleventh aspect of the invention, there is provided a non-transitory computer readable medium comprising program instructions for causing an apparatus to perform at least the following: providing power saving information for adapting at least one operation parameter relating to radio resource management in a low-power mode of a terminal device and sending a control message comprising the power saving information to the terminal device.

According to a twelfth aspect of the invention, there is provided a computer readable medium comprising program instructions for causing an apparatus to perform at least the following: providing power saving information for adapting at least one operation parameter relating to radio resource management in a low-power mode of a terminal device and sending a control message comprising the power saving information to the terminal device.

BRIEF DESCRIPTION OF THE DRAWINGS

For a more complete understanding of example embodiments of the present invention, reference is now made to the following descriptions taken in connection with the accompanying drawings in which:

FIG. 3 illustrates an example method according to an example embodiment of the invention;

FIG. 4 illustrates another example method according to an example embodiment of the invention;

FIG. 5 illustrates a further example method according to an example embodiment of the invention.

DETAILED DESCRIPTION OF THE DRAWINGS

Figure 1:
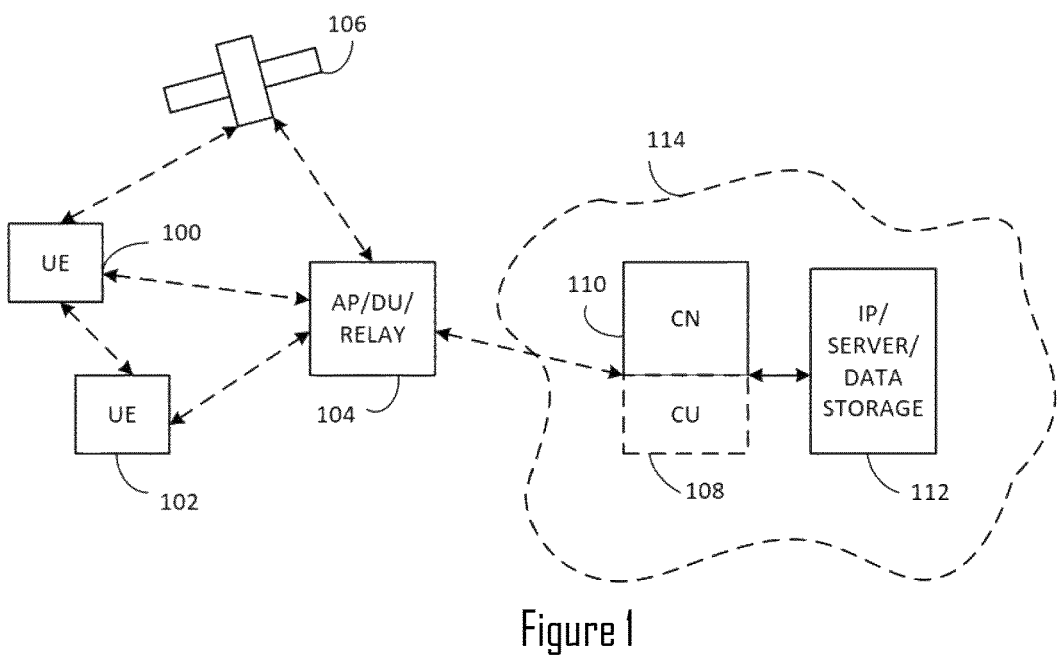
FIG. 1 shows a part of an exemplifying radio access network in which examples of disclosed embodiments may be applied.

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Example embodiments relate to adapting at least one operation parameter relating to radio resource management. More particularly, example embodiments relate to adapting at least one operation parameter in a low-power mode relating to radio resource management.

Example embodiments relate to an apparatus at a client side and an apparatus at a network side. The apparatus at a client side may be a terminal device/user equipment such as a mobile computing device and the apparatus at a network side may be comprised by an access point such as a base station.

According to an example embodiment, an apparatus at a client side is configured to receive a control message comprising power saving information, determine, based on the power saving information, adaptation of at least one operation parameter relating to radio resource management in the low-power mode, and cause adapting the at least one operation parameter relating to radio resource management according to the determined adaptation.

According to an example embodiment, the apparatus at a client side is configured to cause adapting the at least one operation parameter by requesting an apparatus at a network side to adapt the at least one operation parameter or by adapting the at least one operation parameter by the apparatus at the client side.

According to an example embodiment, an apparatus at a network side is configured to provide power saving information for adapting at least one operating parameter relating to radio resource management in a low-power mode of a terminal device and send a control message comprising the power saving information to a terminal device.

According to a further example embodiment, the control message comprises a radio resource control (RRC) message that provides the apparatus at a client side with the power saving information, the power saving information comprising at least one power saving parameter and/or an instruction to enter the low-power mode.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system may comprise more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The (e/g) NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements.

The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device refers, for example, to a wireless mobile communication device operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, navigation device, vehicle infotainment system, and multimedia device, or any combination thereof. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

A wireless device is a generic term that encompasses both the access node and the terminal device.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of content delivery use cases and related applications including, for example, video streaming, audio streaming, augmented reality, gaming, map data, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which may be installed within an operator's network may aggregate traffic from a large number of HNBs back to a core network.

As commonly known in connection with wireless communication systems, control or management information is transferred over a radio interface, e.g. between the terminal device 100 and the access node 104.

A terminal device such as a UE may be surrounded by a plurality of radio access networks (RANs) such as base stations, but a UE may only be registered to one cell. Cell selection is a process for selecting a cell to register to. Cell selection may be performed based on one or more cell selection criteria. Cell selection criteria may comprise different types of criteria such as signal strength or signal quality criteria, public line mobile network (PLMN) criteria or service type criteria. The one or more cell selection criteria may comprise, for example, a criterion indicating whether a cell is transmitting power strong enough to be detected by a UE, whether the public land mobile network PLMN is acceptable to UE or whether the service type of the cell is acceptable to the UE.

After a UE is registered to a cell, the cell is considered as a serving cell. The UE is further configured to, after registering to a cell, to monitor system information and perform radio resource management (RRM) measurements on the serving cell and neighbouring cells. Based on the monitoring and performed measurements, the UE may select another cell to register to, if some other cell is considered as a more suitable cell based on cell re-selection criteria.

However, RRM measurements consume UE battery and it would be beneficial to avoid unnecessary measurements. On the other hand, if measurements are avoided such that as a consequence the UE stays registered to a cell that is not the most suitable, connection establishment related transmission may cause inter-cell interference and additional handovers in the beginning of connections.

Figure 2:
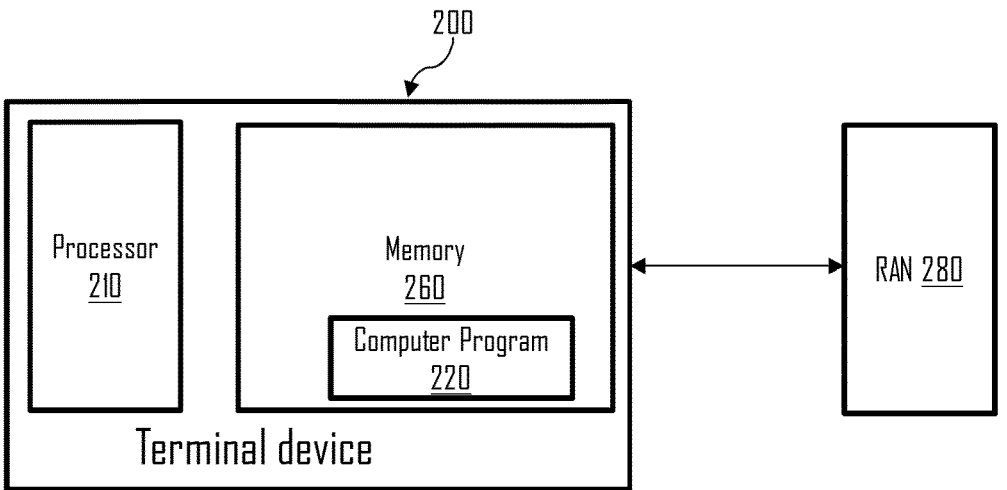
FIG. 2 shows a block diagram of an example apparatus in which examples of the disclosed embodiments may be applied.

The example of FIG. 2 shows an exemplifying apparatus.

FIG. 2 is a block diagram depicting an apparatus 200 operating in accordance with an example embodiment of the invention. The apparatus 200 may be, for example, an electronic device such as a chip, chip-set, an electronic device, a terminal device, a network function or an access node such as a base station. The apparatus comprises one or more control circuitry, such as at least one processor 210, and at least one memory 260, including one or more algorithms such as a computer program instructions 220 wherein the at least one memory 260 and the computer program instructions 220 are configured, with the at least one processor 210 to cause the apparatus 200 to carry out any of the example functionalities described below.

In the example of FIG. 2, the processor 210 is a central unit operatively connected to read from and write to the memory 260. The processor 210 may also be configured to receive control signals received via an input interface and/or the processor 210 may be configured to output control signals via an output interface. In an example embodiment the processor 210 may be configured to convert the received control signals into appropriate commands for controlling functionalities of the apparatus.

The memory 260 stores computer program instructions 220 which when loaded into the processor 210 control the operation of the apparatus 200 as explained below. In other examples, the apparatus 200 may comprise more than one memory 260 or different kinds of storage devices.

Computer program instructions 220 for enabling implementations of example embodiments of the invention or a part of such computer program instructions may be loaded onto the apparatus 200 by the manufacturer of the apparatus 200, by a user of the apparatus 200, or by the apparatus 200 itself based on a download program, or the instructions can be pushed to the apparatus 200 by an external device. The computer program instructions may arrive at the apparatus 200 via an electromagnetic carrier signal or be copied from a physical entity such as a computer program product, a memory device or a record medium such as a Compact Disc (CD), a Compact Disc Read-Only Memory (CD-ROM), a Digital Versatile Disk (DVD) or a Blu-ray disk.

According to an example embodiment, the apparatus 200 comprises a terminal device. The apparatus 200 is configured to communicate with a radio access network (RAN) 280. A terminal device may comprise a UE such as a mobile computing device.

According to an example embodiment, the apparatus 200 is configured to monitor system information and perform measurements relating to radio resource management (RRM) on the serving cell and one or more neighbouring cells. RRM measurement are used for, for example, measuring the signal strength and/or quality of a neighbour for cell selection/re-selection and handover when a UE moves from cell to cell.

RRM measurements may comprise, for example, intra-frequency measurements and/or inter-frequency measurements. Intra-frequency measurements comprise measurements relating to cells operating on the same carrier frequency as that of the serving cell. Inter-frequency measurements comprise measurements relating to cells operating on carrier frequencies other than that of the serving cell. RRM measurement may comprise metrics such as reference signal received power (RSRP), reference signal received quality (RSRQ) and signal-to-noise-ratio (SINR). RRM may be implemented using radio resource control (RRC).

Radio resource control (RRC) is a protocol that comprises functions relating to communication between a terminal device and a radio access network (RAN) such as a gNodeB or eNodeB. For example, RRC comprises connection establishment and release functions, broadcast of system information (SI), and radio bearer establishment, reconfiguration and release between a terminal device and a RAN.

The operation of the RRC is guided by a state machine that defines specific states for a UE. RRC states comprise a connected state such as a RRC_CONNECTED of 3GPP specifications, an inactive state such as RRC_INACTIVE of 3GPP specifications and an idle state such as RRC_IDLE of 3GPP specifications. In different states a UE has different amounts of radio resources available. The UE is further configured to switch from a first state to a second state in response to receiving a command from network.

According to an example embodiment, the apparatus 200 is configured to receive a control message comprising power saving information. The apparatus 200 is configured to receive the control message from a RAN 280 such as a gNodeB or eNodeB.

According to an example embodiment, the apparatus 200 is configured to send a request for low-power operation.

According to an example embodiment, the apparatus 200 is configured to receive the control message in response to sending a request for a low-power operation.

According to an example embodiment, the request for low-power operation comprises a request for low-power mode and/or a request for providing power saving information based on power saving parameters preferred by the apparatus 200. Parameters preferred by the apparatus 200 may comprise, for example, an indication of preference to operate in a low-power mode, an indication of overheating, a request for overheating assistance, an indication of delay budget reporting and/or a request to change operation parameters.

An indication of preference to operate in a low-power mode may comprise one or more states. The one or more states may comprise, for example, a normal state, a state indicating a preference for power saving, an RRC release state and a state indicating that power saving is preferred in an RRC connected state.

A request for overheating assistance may comprise, for example, a request to adapt one or more operation parameters such as a number of MIMO layers, a number of component carriers, operation bandwidth for uplink and/or downlink or a specific frequency range.

An indication of delay budget reporting may comprise, for example, a request to change or adapt discontinuous reception cycle (DRX).

The apparatus 200 may be configured to provide the parameters preferred by the apparatus 200 in an RRC message. The parameters may be provided by the apparatus 200 in UE assistance information of 3GPP specifications, in a MAC CE or L1 signalling.

An RRC message may comprise a plurality of information elements. For example, when an RRC message comprises a request for overheating assistance and a preference to operate in a low-power mode, the apparatus at the network side is configured to interpret that the apparatus 200 prefers a low-power mode with parameters provided in the request for overheating assistance. As another example, when an RRC message comprises an indication of delay budget reporting and a preference to operate in a low-power mode, the network side is configured to interpret that the apparatus 200 prefers a low-power mode with parameters provided in the indication of delay budget reporting. As a further example, when an RRC message comprises a preference to operate in a low-power mode and both a request for overheating assistance and an indication of delay budget reporting, the apparatus at the network side is configured to interpret that the apparatus 200 prefers a low-power mode with parameters provided in the indication of delay budget reporting and parameters provided in the request for overheating assistance.

As another example, when an RRC message comprises an indication of delay budget reporting and a preference to operate in a low-power mode or an indication that the apparatus 200 requests/prefers lower power mode with indicated parameters. In an example when the indication is provided together or the indication is associated with the provided indication of delay budget reporting, the network side is configured to interpret that the apparatus 200 prefers a low-power mode with parameters provided in the indication of delay budget reporting. In some examples, the indication may be a power preference indication. In some examples, the indication may be an indication associated with the delay budget reporting wherein the apparatus 200 requests or prefers low power-mode with indicated parameters. When the indication is not provided or in other words indication is not set, the assistance information is interpreted as request for configuration for preferred delay budget.

As another example, when an RRC message comprises an indication of overheating assistance information and a preference to operate in a low-power mode or an indication that apparatus 200 requests/prefers lower power-mode with indicated overheating assistance parameters. In an example when the indication is provided together or the indication is associated with the provided indication of overheating assistance information, the network side is configured to interpret that the apparatus 200 prefers a low-power mode with parameters provided in the indication of overheating assistance information. In some examples, the indication may be a power preference indication. In some examples, the indication may be an indication associated with the overheating assistance information wherein the apparatus 200 requests or prefers low power-mode with indicated parameters. When the indication is not provided or in other words indication is not set by the apparatus 200, the overheating assistance information is interpreted as request for configuration for overheating (i.e. UE has experienced/detected overheating).

The RRC message may also comprise an indication that the apparatus 200 prefers to release the RRC connection or an indication that the apparatus 200 prefers to not to release the RRC connection. For example, if a preference to operate in a low-power mode in not included in the RRC message, the apparatus at the network side may be configured to determine that the apparatus 200 prefers to release the RRC connection. However, if a preference to operate in a low-power mode is included in the RRC message, the apparatus 200 at the network side may be configured to determine that the apparatus prefers not to release the RRC connection.

Power saving information may comprise different types of information relating to a low-power mode. For example, power saving information may comprise information relating to entering a low-power mode and/or one or more parameters relating to the low-power mode.

According to an example embodiment, the power saving information comprises an instruction to enter a low-power mode.

Power saving information may comprise information relating to a low-power mode of the apparatus 200. A low-power mode enables reducing power consumption of the apparatus 200, for example, by reducing the number of operations performed by the apparatus 200. For example, the apparatus 200 may be configured to enter a low-power mode when it is not transmitting or receiving data. In a low-power mode the power consumption of the apparatus 200 is less than in an active mode. According to an example embodiment, a low-power mode of the apparatus 200 comprises a mode in which the apparatus 200 has less radio resources available than in an active mode.

According to an example embodiment, the control message comprises a connection release message. A connection release message may comprise, for example, a radio resource control release message. The radio resource control release message is configured to cause the apparatus 200 to release established radio bearers, radio resources and/or suspend established radio bearers between the apparatus 200 and the RAN 280.

According to an example embodiment, the control message comprises an RRCRelease message of 3GPP specifications and the power saving information and/or the instruction to enter a low-power mode are provided in a separate information element (IE) in the RRCRelease message.

According to another example embodiment, the control message comprises an independent radio resource control (RRC) message that is associated with the RRCRelease message.

According to a further example embodiment, the control message comprises an independent RRC message that is associated with reception of the RRCRelease message.

According to a further example embodiment, the control message comprises a broadcast RRC message such as System Information Block (SIB) or Master Information Block (MIB) or the like.

According to a further example embodiment, the control message comprises a dedicated RRC message that provides the apparatus 200 the power saving information and/or the instruction to enter a low-power mode.

According to a further example embodiment, the control message comprises an RRC message (e.g. a dedicated or broadcast message) that provides the apparatus 200 the power saving information and/or the instruction to enter a low-power mode wherein the low power mode comprises of adapting operation parameters in idle, inactive, connected mode or in any RRC mode.

According to a yet further example embodiment, the control message comprises a medium access control (MAC) control element (CE).

According to an example embodiment, the apparatus 200 is not allowed perform power saving unless receiving the instruction to enter the low-power mode.

According to an example embodiment, the apparatus 200 is configured to enter the low-power mode in response to receiving the control message.

According to an example embodiment, the low-power mode comprises an inactive mode, an idle mode or adapted operation in connected mode. According to an example embodiment, an inactive mode comprises an inactivated radio resource control (RRC) connection. According to an example embodiment, an idle mode comprises a suspended radio resource control (RRC) connection. According to an example embodiment, adapted operation in connected mode comprises a mode in which a terminal device has an active RRC connection, but the operation of the terminal device adapted in order to save power.

According to an example embodiment, the apparatus 200 is configured determine presence of power saving information in the control message. For example, the apparatus 200 may be configured to determine whether the control message comprises power saving information or not.

According to an example embodiment, the apparatus 200 is configured to determine, based on the power saving information, adaptation of at least one operation parameter relating to radio resource management in the low-power mode. An operation parameter may relate to, for example, L3 RRM measurements, layer 3 mobility or beam management. As another example, an operation parameter may relate to a number of component carriers configured, activated or used for the apparatus 200, a number of MIMO layers, operation bandwidth for downlink and/or uplink, a number of configured or active bandwidth parts aggregated bandwidth, length of a discontinuous reception cycle or the like.

According to an example embodiment, the at least one operation parameter comprises at least one measurement relating to radio resource management. For example, an operation parameter may comprise a measurement period, measurement bandwidth, measurement quality such as RSRP, SINR, RSRQ, a number of measure intra- and/or inter-frequency layers, a number of measured cells, a number of measured reference signals such as synchronization signal, Physical Broadcast Channel (SS/PBCH) block, CSI-RS for L3 mobility, CSI-RS for beam management or the like.

According to an example embodiment, the power saving information comprises an instruction to enter a low-power mode.

According to an example embodiment, the power saving information comprises an indication whether the apparatus 200 is allowed to adapt at least one measurement relating to radio resource management in the low-power mode. The indication may comprise an indication that the apparatus 200 is allowed to adapt at least one measurement relating to radio resource management in the low-power mode of the apparatus 200 or that the apparatus 200 is not allowed to adapt the at least one measurement relating to radio resource management in the low-power mode of the apparatus 200.

According to an example embodiment, the power saving information comprises at least one power saving parameter. A power saving parameter may comprise, for example, reference signal received power (RSRP) threshold for cell quality, individual synchronization signal block (SSB) RSRP threshold, RSRB variation threshold or a timer value for evaluating a mobility condition of the apparatus 200.

According to an example embodiment, the one or more parameters override broadcast parameters.

According to an example embodiment, the power saving information comprises at least one power saving parameter and an indication that the apparatus 200 is allowed to adapt the at least one measurement relating to radio resource management in the low-power mode.

For example, a control message may comprise power saving information indicating that the apparatus 200 is allowed to adapt the at least one measurement in a low-power mode according to broadcast parameters in system information. The broadcast parameters may be provided in a new system information block (SIB) for power saving or in an existing SIB.

As another example, a control message may comprise power saving information indicating that the apparatus 200 is allowed to adapt the at least one measurement in a low-power mode according to power saving parameters comprised by the control message.

As a further example, a control message may comprise power saving information indicating that the apparatus 200 is allowed to adapt the at least one measurement without first evaluating adaptation conditions provided in system information.

According to an example embodiment, the power saving information comprises an indication that the apparatus 200 is not allowed to adapt the at least one measurement relating to radio resource management in the low-power mode.

For example, a control message may comprise power saving information indicating that the apparatus 200 is not allowed to adapt the at least one measurement in a low-power mode according to parameters comprised by the control message.

According to an example embodiment, the power saving information comprises a timer for controlling the adaptation of the at least one measurement. The timer that may be applied together with other power saving information.

Controlling the adaptation of the at least one measurement may comprise, for example, supervising the adaptation of the at least one measurement or preventing adaption of the at least one measurement.

According to an example embodiment, when the power saving information comprises one or more parameters associated with a timer, the parameters associated with the timer become invalid in response to expiry of the timer.

According to another example embodiment, when the apparatus 200 is not allowed to adapt the at least one measurement, the apparatus 200 is allowed to evaluate conditions for power saving in response to expiry of the timer.

According to a further example embodiment, the apparatus 200 is allowed to adapt the at least one measurement when the timer is running. In response to expiry of the timer, the apparatus 200 is configured to perform normal measurements.

According to a yet further example embodiment, the apparatus 200 is not allowed to adapt the at least one measurement when the timer is running. In response to expiry if the timer, the apparatus 200 is configured to evaluate one or more criteria whether adapting the at least one measurement is allowed.

According to an example embodiment, the timer is valid on a cell where the timer was signalled for the apparatus 200. According to an example embodiment, the timer is valid until it expires regardless of any cell selections or re-selections. According to an example embodiment, the timer is stopped or suspended when a new connection between the apparatus 200 and a base station is established or when a connection between the apparatus 200 and a base station is resumed.

Adapting the at least one measurement may comprise changing the way of performing the at least one measurement. Adapting the at least one measurement may comprise adapting a frequency of measurements performed, adapting the number of measurements performed, adapting a type of measurements performed and/or adapting a quality of measurements performed. For example, adapting the at least one measurement may comprise performing less measurements in a low-power mode than in an active mode.

According to an example embodiment, adapting the at least one measurement relating to radio resource management comprises modifying a measurement period for the at least one measurement.

According to an example embodiment, adapting the at least one measurement relating to radio resource management comprises adapting a number or a frequency of performed measurements.

According to an example embodiment, adapting at least one measurement comprises relaxing at least one measurement relating to radio resource management. Relaxing at least one measurement relating to radio resource management may comprise, for example, reducing a number of performed measurements or scaling, such as extending, a time period for performing measurements.

Additionally or alternatively, adapting the at least one measurement may also comprise reducing a number of bands, frequencies and/or cells from measurements relating to radio resource management.

According to an example embodiment, the apparatus 200 is configured to adapt the at least one measurement relating to radio resource management in dependence upon existence of one or more power saving parameters in the control message. For example, the apparatus 200 may be allowed to adapt the at least one measurement when the control message comprises one or more parameters. As another example, the apparatus 200 may be allowed to adapt the at least one measurement only when the control message comprises one or more parameters. As a further example, the apparatus 200 may be allowed to adapt the at least one measurement only when the control message comprises one or more parameters and solely according to the one or more parameters.

According to an example embodiment, the apparatus 200 is configured to cause adapting the at least one operation parameter relating to radio resource management according to the determined adaptation.

Causing adapting the at least one operation parameter may comprise requesting an apparatus at the network side to adapt the at least one operation parameter or the apparatus 200 may be configured to adapt the at least one operation parameter.

According to an example embodiment, the apparatus 200 is configured to cause adapting the at least one operation parameter by requesting a base station to adapt the at least one operation parameter.

According to another example embodiment, the apparatus 200 is configured to cause adapting the at least one operation parameter by adapting the at least one operation parameter.

According to an example embodiment, the apparatus 200 is configured to cause adapting the at least operation parameter for the serving cell, non-serving cell or both the serving cell and non-serving cell.

According to an example embodiment, the apparatus 200 is configured to cancel or suspend the adaptation of the at least one measurement in response to receiving information upon a detected event.

According to an example embodiment, the event comprises at least one of the following: receiving paging, receiving an indication of a change in system information or receiving a public warning system (PWS) message. A PWS message may comprise a commercial mobile alert service (CMAS), an earthquake and tsunami warning system (ETWS) message or the like.

In a situation where the apparatus 200 receives an indication of a change in system information, the apparatus 200 is configured to determine whether any power saving related parameters are updated. If no power saving related parameters are updated, the apparatus 200 is configured to continue the adaptation. If any power saving parameters are updated the apparatus 200 is configured to determine whether any conditions for adaptation are still fulfilled.

In a situation where the apparatus 200 cancels or suspends the adaptation in response to receiving public warning system message, the apparatus 200 may be prohibited to apply the adaptation until the warning has been disabled and/or a configured timer has expired.

According to an example embodiment, the event comprises a change in operation of the apparatus 200. The event may comprise an event relating to cell selection and/or cell re-selection or a change a state of the apparatus 200.

According to an example embodiment, the apparatus 200 is configured to cancel adaptation of the at least one measurement in response to entering an active mode. An active mode may comprise, for example, a connected mode.

According to another example embodiment, the apparatus 200 is configured to cancel adaptation of the at least one measurement in response to re-selecting another cell.

According to a further example embodiment, the apparatus 200 is configured to cancel adaptation of the at least one measurement in response to changing tracking area. A tracking area comprises a set of cells and/or gNodeBs wherein the apparatus 200 is not required to update its location to network. Upon re-selecting a cell, belonging to different tracking area or moving out of the area where the apparatus 200 is currently registered, the apparatus 200 may be required to update its location to the network.

According to a yet further example embodiment, the apparatus 200 is configured to cancel adaptation of the at least one measurement in response to changing RAN notification area. A RAN notification area comprises a set of cells and/or gNodeBs such as, RAN Notification Area List (RNA) wherein the apparatus 200 is not required to update its location to network. Upon re-selecting a cell belonging to a notification area different from the area the apparatus 200 is currently registered or moving out of the area of cells in the list, the apparatus 200 may be required to update its location or provide an indication to the network.

According to a yet further example embodiment, the apparatus 200 is configured to cancel adaptation of the at least one measurement in response to determining to monitor paging on a different synchronization block (SSB) or set of SSBs on the current serving cell after receiving the control message.

According to a yet further example embodiment, the apparatus 200 is configured to cancel adaptation of the at least one measurement in response to determining that a low mobility/stationary condition does not apply anymore.

As mentioned above, the apparatus 200 at the client side such as a terminal device is configured to communicate with the apparatus 280 at the network side such as a RAN.

According to another example embodiment, the apparatus 280 at the network side comprises a radio access network (RAN) such as a base station. A radio access network (RAN) may comprise a base station, such as an eNodeB or a gNodeB, and antennas that cover a given geographical region. According to an example embodiment, the apparatus 200 is a base station.

According to an example embodiment, the apparatus 280 comprises, similarly to the apparatus 200, one or more control circuitry, such as at least one processor, and at least one memory, including one or more algorithms such as a computer program instructions wherein the at least one memory and the computer program instructions are configured, with the at least one processor to cause the apparatus 280 to carry out any of the example functionalities described below.

According to an example embodiment, the apparatus 280 is configured to provide power saving information for adapting at least one measurement relating to radio resource management in a low-power mode of an apparatus 200. The apparatus 200 may be, for example, a terminal device.

According to an example embodiment, the apparatus 280 is further configured to send a control message comprising the power saving information and an instruction to enter a low-power mode to the apparatus 200.

According to an example embodiment, the low-power mode comprises an inactive mode or an idle mode.

As mentioned above, the power saving information may comprise an indication whether the apparatus 200 allowed to adapt the at least one measurement relating to radio resource management and/or at least one power saving parameter. Power saving information may also comprise a timer for controlling the adaptation of the at least one measurement relating radio resource management.

The control message may comprise a connection release message such as a radio resource control release message.

Without limiting the scope of the claims, an advantage of a network side apparatus sending power saving information and an instruction to a client-side apparatus to enter a low-power mode may be that a network controlled power saving of a terminal device may be provided.

According to an example embodiment, the apparatus 200 comprises means for performing features of the apparatus 200, wherein the means for performing comprises at least one processor 210, at least one memory 260 including computer program code 220, the at least one memory 260 and the computer program code 220 configured to, with the at least one processor 210, cause the performance of the apparatus 200. The means for performing features of the apparatus 200 may comprise, for example, means for receiving a control message comprising power saving information. The means for performing may further comprise means for determining, based on the power saving information, adaptation of at least one operation parameter relating to radio resource management in the low-power mode and means for causing adapting the at least one operation parameter relating to radio resource management according to the determined adaptation. The means for performing may further comprise means for entering a low-power mode in response to receiving the control message and means for cancelling or suspending the adaptation in response to receiving information upon a predetermined event.

According to an example embodiment, the apparatus 280 comprises means for performing features of the apparatus 100, wherein the means for performing comprises at least one processor, at least one memory including computer program code, the at least one memory and the computer program code configured to, with the at least one processor, cause the performance of the apparatus 100. The means for performing features of the apparatus 100 may comprise, for example, means for providing power saving information for adapting at least one measurement relating to radio resource management in a low-power mode of a terminal device.

The means for performing may further comprise means for sending a control message comprising the power saving information and an instruction to enter a low-power mode to the terminal device.

FIG. 3 illustrates a method 300 incorporating aspects of the previously disclosed embodiments. More specifically, the example method 300 illustrates adapting at least one operation parameter relating to radio resource management. In the example of FIG. 3, the at least one operation parameter comprises at least one measurement relating to radio resource management. The method 300 may be performed by the apparatus 200 such as a mobile computing device.

The method starts with receiving 305 a control message comprising power saving information and an instruction to enter a low-power mode. The power saving information may comprise at least one power saving parameter and/or an indication whether the terminal device is allowed to adapt the at least one measurement relating to radio resource management or not. The power saving information may further comprise a timer for controlling the adaptation of the at least one measurement. The low-power mode may comprise an inactive mode or an idle mode.

The method continues with determining 310, based on the control message, adaptation of the at least one measurement relating to radio resource management. More particularly, the method continues with determining, based on the power saving information, adaptation of the at least one measurement relating to radio resource management in the low-power mode.

The method further continues with adapting 315 the at least one measurement relating to radio resource management according to the determined adaptation.

FIG. 4 illustrates another method 400 incorporating aspects of the previously disclosed embodiments. The method 400 may be performed by the apparatus 200 such as a mobile computing device.

The method starts with receiving 405 a control message. The control message may comprise power saving information and/or an instruction to enter a low-power mode. The low-power mode may comprise, for example, an inactive mode or an idle mode.

The method continues with determining 410 presence of power saving information in the control message. The power saving information comprises an indication whether the apparatus 200 is allowed to adapt at least one measurement relating to radio resource management and/or at least one power saving parameter.

If the control message does not comprise 415 an indication whether the apparatus 200 is allowed to adapt at least one measurement relating to radio resource measurement and/or at least one power saving parameter, the method ends.

If the control message comprises 415 an indication whether the apparatus 200 is allowed to adapt the at least one measurement relating to radio resource management and/or at least one power saving parameter, it is determined whether the apparatus 200 is allowed to adapt the at least one measurement relating to radio resource management or not.

If the indication indicates 420 that the apparatus 200 is not allowed to adapt the at least one measurement relating to radio resource management, power saving is not applied 425.

If the indication indicates 420 that the apparatus 200 is allowed to adapt the at least one measurement relating to radio resource management, power saving is applied 430 according to the power saving parameters provided in the control message. If power saving parameters are not provided in the control message, for example, broadcast parameters or some other criteria may be applied. In some examples, the apparatus 200 is not be provided with the control message. In such a case, the apparatus 200 may be configured to determine power saving parameters based on the broadcast information.

Further, if the power saving information comprises a timer, power saving is applied 435 under control of the timer. For example, the power saving parameters may be applied during the duration of the timer.

The method further continues with monitoring 440 conditions for a situation when power saving cannot be applied.

FIG. 5 illustrates a method 500 incorporating aspects of the previously disclosed embodiments. More specifically, the example method 500 illustrates sending a control message. The method 500 may be performed by the apparatus 280 such as a RAN.

The method starts with providing 505 power saving information for adapting at least one measurement relating to radio resource management in a low-power mode of a terminal device such as the apparatus 200.

The low-power mode may comprise an inactive mode, an idle mode or an adapted connected mode. The power saving information comprises an indication whether the terminal device is allowed to adapt the at least one measurement relating to radio resource management and/or at least one power saving parameter. The power saving information may also comprise a timer for controlling the adaptation of the at least one measurement relating to radio resource management.

The method continues with sending 510 a control message comprising the power saving information and an instruction to enter a low-power mode to the terminal device. The control message may comprise a radio resource control message such as a radio resource control release message.

Without limiting the scope of the claims, an advantage of adapting at least one measurement relating to radio resource management in a low-power mode is that power consumption of a terminal device may be reduced. Another advantage is that customized power saving may be provided for each terminal device.

Without in any way limiting the scope, interpretation, or application of the claims appearing below, a technical effect of one or more of the example embodiments disclosed herein is that network-controlled power saving of a terminal device may be performed in a customized manner.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus comprising at least one processor and at least one memory including computer program code, the at least one memory and the computer program code configured to with the at least one processor, cause the apparatus at least to:

receive a connection release message comprising power saving information, indicating that the apparatus is allowed to adapt at least one measurement relating to radio resource management in a low-power mode, wherein the power saving information comprises at least one power saving parameter;

determine, based on the power saving information, adaptation of the at least one measurement relating to radio resource management in the low-power mode; and cause adapting the at least one measurement relating to radio resource management according to the determined adaptation;

wherein adapting the at least one measurement relating to radio resource management comprises modifying a measurement period for the at least one measurement; and wherein the low-power mode comprises an inactive mode, an idle mode or adapted operation in connected mode.

2. The apparatus according to claim 1, wherein either: the apparatus is configured to cause adapting the at least one measurement by requesting a base station to adapt the at least one measurement; or the apparatus is configured to perform adapting the at least one measurement.

3. The apparatus according to claim 1, wherein the power saving information comprises at least one of:

at least one power saving parameter and an indication that the apparatus is allowed to adapt the at least one measurement relating to radio resource management in the low-power mode; or an indication that the apparatus is not allowed to adapt the at least one measurement relating to radio resource management in the low-power mode.

4. The apparatus according to claim 1, wherein the power saving information comprises at least one of:

a timer for controlling the adaptation of the at least one measurement; or an instruction to enter a low-power mode.

5. The apparatus according to claim 1, wherein the apparatus is configured to enter the low-power mode in response to receiving the connection release message.

6. The apparatus according to claim 1, wherein adapting the at least one measurement relating to radio resource management comprises adapting a number or a frequency of performed measurements.

7. The apparatus according to claim 1, wherein the apparatus is configured to send a request for low-power operation.

8. The apparatus according to claim 7, wherein the request for low-power operation comprises a request for a low-power mode and/or a request for providing power saving information based on power saving parameters preferred by the apparatus.

9. The apparatus according to claim 7, wherein the apparatus is configured to receive the connection release message in response to sending the request for low-power operation.

10. The apparatus according to claim 1, wherein the apparatus is a terminal device.

11. An apparatus comprising at least one processor and at least one memory including computer program code, the at least one memory and the computer program code configured to with the at least one processor, cause the apparatus at least to:

provide power saving information for adapting at least one measurement relating to radio resource management in a low-power mode of a terminal device, indicating that the terminal device is allowed to adapt at least one measurement relating to radio resource management in a low-power mode, wherein the power saving information comprises at least one power saving parameter; and send a connection release message comprising the power saving information to the terminal device, to enable the terminal device to adapt the at least one measurement relating to radio resource management including a measurement period for the at least one measurement;

wherein the low-power mode comprises an inactive mode, an idle mode or adapted operation in connected mode.

12. The apparatus according to claim 11, wherein the power saving information comprises at least one of:

at least one power saving parameter; or a timer for controlling the adaptation of the at least one measurement.

13. The apparatus according to claim 11, wherein the apparatus is a base station.

14. A method comprising:

providing power saving information for adapting at least one measurement relating to radio resource management in a low-power mode of a terminal device, indicating that the terminal device is allowed to adapt at least one measurement relating to radio resource management in a low-power mode, wherein the power saving information comprises at least one power saving parameter; and sending a connection release message comprising the power saving information to the terminal device, to enable the terminal device to adapt the at least one measurement relating to radio resource management including a measurement period for the at least one measurement;

wherein the low-power mode comprises an inactive mode, an idle mode or adapted operation in connected mode.

15. A method comprising:

receiving by a terminal device a connection release message comprising power saving information, indicating that the terminal device is allowed to adapt at least one measurement relating to radio resource management in a low-power mode, wherein the power saving information comprises at least one power saving parameter;

determining, based on the power saving information, adaptation of the at least one measurement relating to radio resource management in the low-power mode; and causing adapting the at least one measurement relating to radio resource management according to the determined adaptation;

wherein adapting the at least one measurement relating to radio resource management comprises modifying a measurement period for the at least one measurement;

wherein the low-power mode comprises an inactive mode, an idle mode or adapted operation in connected mode.

* * * * *